US 9,760,199 B2

(12) United States Patent
Yang

(10) Patent No.: US 9,760,199 B2
(45) Date of Patent: Sep. 12, 2017

(54) PIXEL DRIVING CIRCUIT AND DRIVING METHOD THEREOF, ARRAY SUBSTRATE AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE Technology Group., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 14/443,445

(22) PCT Filed: Sep. 2, 2014

(86) PCT No.: PCT/CN2014/085778
§ 371 (c)(1),
(2) Date: May 18, 2015

(87) PCT Pub. No.: WO2015/172465
PCT Pub. Date: Nov. 19, 2015

(65) Prior Publication Data
US 2016/0062522 A1 Mar. 3, 2016

(30) Foreign Application Priority Data
May 14, 2014 (CN) .......................... 2014 1 0203607

(51) Int. Cl.
*G06F 3/045* (2006.01)
*G06F 3/041* (2006.01)
(Continued)

(52) U.S. Cl.
CPC ............ *G06F 3/0412* (2013.01); *G06F 3/042* (2013.01); *G06F 3/044* (2013.01); *G06F 3/0416* (2013.01);
(Continued)

(58) Field of Classification Search
CPC ...... G06F 3/0412; G06F 3/0416; G06F 3/042; G06F 3/044; G09G 2300/043;
(Continued)

(56) References Cited

U.S. PATENT DOCUMENTS 7,158,129 B2 * 1/2007 Nakajima ........... G06F 3/03545
345/175
7,532,182 B2 * 5/2009 Tseng .................... G06F 3/0412
345/156
(Continued)

FOREIGN PATENT DOCUMENTS

CN 102402931 A 4/2012
CN 102495699 A 6/2012
(Continued)

OTHER PUBLICATIONS

WIPO Machine Translation of CN202905119 (U) published Apr. 24, 2013.*
(Continued)

*Primary Examiner* — Michael J Jansen, II
(74) *Attorney, Agent, or Firm* — Banner & Witcoff, Ltd.

(57) ABSTRACT

A pixel driving circuit and method, an array substrate and a display apparatus are provided. The driving circuit includes: a data line, a first scan line, a second scan line, a power supply line, a light emitting device, a display sub-circuit and a photosensitive sub-circuit; the display sub-circuit is connected to the data line, the first scan line, the second scan line, the power supply line and the light emitting device, and is configured to drive the light emitting device to emit light
(Continued)

for display under the control of the first scan line, the second scan line, the data line and the power supply line; and the photosensitive sub-circuit is connected to the second scan line, and is configured to sense a touch action under the control of the second scan line.

14 Claims, 8 Drawing Sheets

(51) Int. Cl.
    *G06F 3/044* (2006.01)
    *G09G 3/3258* (2016.01)
    *G09G 3/3266* (2016.01)
    *G09G 3/3291* (2016.01)
    *G09G 3/3233* (2016.01)
    *G06F 3/042* (2006.01)

(52) U.S. Cl.
    CPC ......... *G09G 3/3233* (2013.01); *G09G 3/3258* (2013.01); *G09G 3/3266* (2013.01); *G09G 3/3291* (2013.01); *G09G 2300/043* (2013.01); *G09G 2300/0842* (2013.01); *G09G 2310/0248* (2013.01); *G09G 2310/0278* (2013.01); *G09G 2320/0626* (2013.01); *G09G 2354/00* (2013.01)

(58) Field of Classification Search
    CPC ... G09G 2300/0842; G09G 2310/0248; G09G 2310/0278; G09G 2320/0626; G09G 2354/00; G09G 3/3233; G09G 3/3258; G09G 3/3266; G09G 3/3291
    See application file for complete search history.

(56) References Cited

U.S. PATENT DOCUMENTS

| | | | | |
|---|---|---|---|---|
| 7,859,526 B2* | 12/2010 | Konicek | ............. | G06K 9/0004 345/156 |
| 7,924,272 B2* | 4/2011 | Boer | ............. | G06F 3/0412 178/18.09 |
| 8,248,396 B2* | 8/2012 | Konicek | ............. | G06K 9/0004 345/156 |
| 8,575,530 B2* | 11/2013 | Chan | ............. | G09G 3/3233 250/208.1 |
| 9,280,929 B2* | 3/2016 | In | ............. | G09G 3/3208 |
| 9,330,600 B2* | 5/2016 | Tan | ............. | G09G 3/3258 |
| 2003/0076295 A1* | 4/2003 | Nakajima | ............. | G06F 3/03545 345/156 |
| 2005/0285822 A1* | 12/2005 | Reddy | ............. | G06F 3/03542 345/76 |
| 2006/0187367 A1* | 8/2006 | Abileah | ............. | G06F 3/042 349/37 |
| 2006/0214893 A1* | 9/2006 | Tseng | ............. | G06F 3/0412 345/82 |
| 2007/0040769 A1 | 2/2007 | Tai et al. | | |
| 2008/0211746 A1 | 9/2008 | Caligiore et al. | | |
| 2009/0231308 A1* | 9/2009 | Numao | ............. | G09G 3/3233 345/204 |
| 2010/0012823 A1 | 1/2010 | Ahn et al. | | |
| 2011/0057866 A1* | 3/2011 | Konicek | ............. | G06K 9/0004 345/82 |
| 2012/0061556 A1* | 3/2012 | Chan | ............. | G09G 3/3233 250/214 R |
| 2014/0009412 A1 | 1/2014 | Ahn et al. | | |
| 2015/0002414 A1* | 1/2015 | Tan | ............. | G06F 3/044 345/173 |
| 2015/0002432 A1* | 1/2015 | Tan | ............. | G09G 3/3258 345/173 |
| 2015/0103037 A1* | 4/2015 | Wu | ............. | G09G 3/3233 345/174 |
| 2015/0193045 A1* | 7/2015 | Zhou | ............. | G09G 3/3233 345/174 |
| 2015/0268763 A1* | 9/2015 | Zhou | ............. | G06F 3/0412 345/174 |
| 2015/0301674 A1* | 10/2015 | Tan | ............. | G06F 3/042 345/173 |
| 2015/0302793 A1* | 10/2015 | In | ............. | G09G 3/3208 345/211 |
| 2015/0302801 A1* | 10/2015 | Tan | ............. | G06F 3/042 345/173 |
| 2015/0378470 A1* | 12/2015 | Yang | ............. | G06F 3/0416 345/174 |
| 2016/0062522 A1* | 3/2016 | Yang | ............. | G06F 3/0412 345/174 |
| 2016/0103513 A1* | 4/2016 | Yang | ............. | G06F 3/041 345/175 |
| 2016/0132171 A1* | 5/2016 | Hu | ............. | G06F 3/0416 345/174 |
| 2016/0179256 A1* | 6/2016 | Yang | ............. | G06F 3/0412 345/173 |
| 2016/0204166 A1* | 7/2016 | Yang | ............. | H01L 27/323 345/173 |

FOREIGN PATENT DOCUMENTS

| | | |
|---|---|---|
| CN | 202905119 U | 4/2013 |
| CN | 103135846 A | 6/2013 |
| CN | 103310728 A | 9/2013 |
| CN | 103310734 A | 9/2013 |
| CN | 203288218 U | 11/2013 |
| CN | 203366704 U | 12/2013 |
| CN | 203366705 U | 12/2013 |
| CN | 103700345 A | 4/2014 |
| CN | 103971639 A | 8/2014 |
| CN | 103996376 A | 8/2014 |
| CN | 103996377 A | 8/2014 |
| CN | 104064140 A | 9/2014 |
| CN | 203812536 U | 9/2014 |
| CN | 203825988 U | 9/2014 |
| CN | 104091559 A | 10/2014 |
| CN | 104102382 A | 10/2014 |
| CN | 203870951 U | 10/2014 |
| JP | 2010085526 A | 4/2010 |

OTHER PUBLICATIONS

Aug. 21, 2015—(CN)—First Office Action Appn 201410203607.X with English Tran.

Jan. 30, 2015—(WO) International Search Report—App PCT/CN2014/088766—Eng Tran.

* cited by examiner

PIXEL DRIVING CIRCUIT AND DRIVING METHOD THEREOF, ARRAY SUBSTRATE AND DISPLAY APPARATUS

The application is a U.S. National Phase Entry of International Application No. PCT/CN2014/085778 filed on Sep. 2, 2014, designating the United States of America and claiming priority to Chinese Patent Application No. 201410203607.X and filed on May 14, 2014. The present application claims priority to and the benefit of the above-identified applications and the above-identified applications are incorporated by reference herein in their entirety.

TECHNICAL FIELD OF THE DISCLOSURE

The present disclosure relates to a field of display technology, and particularly to a pixel driving circuit and a driving method thereof, an array substrate and a display apparatus.

BACKGROUND

Active Matrix Organic Light Emitting Diode Display (AMOLED) is a hotspot in the current research field of flat panel display. Compared to a liquid crystal display, OLED has advantages such as low power consumption, low manufacturing cost, self luminescent, wide viewpoint, and fast response, etc. At present, in the display field of mobile phones, personal digital assistants (PDA), and digital camera, etc., OLED has began to replace the conventional LCD display. Design of pixel driving circuit is a core technology of the AMOLED display, and is thus of great significance in research.

At present, part of photosensitive in cell touch technology has been successfully used in the LCD display and mass production has been achieved in the industry successfully by top-level manufacturers. The photosensitive touch not only possesses the same touch sensitivity and functionality as the capacitive touch manner, but also has an outstanding advantage that the photosensitive touch is not limited by a size of a screen and thus plays an important role in a large size touch application. In addition, the photosensitive touch not only can be achieved by a direct finger touch, but also can be achieved by a direct touch via a laser pen remotely.

Therefore, an integration of the photosensitive in cell touch technology and AMOLED, i.e. the integration of the Touch manufacturing process and the AMOLED manufacturing process which represent two newest technologies, would play a leading role in the display field in future. Therefore, the high efficient integration of the AMOLED display technology and the photosensitive in cell touch is urgently expected.

SUMMARY

According to embodiments of the present disclosure, it can be achieved that the AMOLED display is integrated with in cell touch efficiently.

According to one aspect of the present disclosure, it is provided a pixel driving circuit comprising: a data line, a first scan line, a second scan line, a power supply line, a light emitting device, a display sub-circuit and a photosensitive sub-circuit; wherein the display sub-circuit is connected to the data line, the first scan line, the second scan line, the power supply line and the light emitting device, and is configured to drive the light emitting device to emit light for display under the control of the first scan line, the second scan line, the data line and the power supply line; and the photosensitive sub-circuit is connected to the second scan line, and is configured to sense a touch action under the control of the second scan line.

Optionally, the photosensitive sub-circuit comprises: a reference signal line, a signal detecting line, a first storage capacitor, a signal sensing unit and a signal reading-writing unit; wherein the signal reading-writing unit is connected to a first terminal of the first storage capacitor, the second scan line and the signal detecting line, and is configured to write a signal on the signal detecting line into the first terminal of the first storage capacitor, or to read out a signal stored in the first storage capacitor and transmit the same to the signal detecting line under the control of the second scan line; and the signal sensing unit is connected to the second scan line, the reference signal line and the first storage capacitor, and is configured to write a signal on the reference signal line and a sensed photosensitive signal into the first storage capacitor under the control of the second scan line.

Optionally, the signal reading-writing unit comprises a sixth transistor having a gate connected to the second scan line, a source connected to the first terminal of the first storage capacitor, and a drain connected to the signal detecting line, and being configured to write the signal on the signal detecting line into the first terminal of the first storage capacitor, or to read out the signal stored in the first storage capacitor and transmit the same to the signal detecting line under the control of the second scan line.

Optionally, the signal sensing unit comprises a seventh transistor and a photosensitive transistor, wherein the seventh transistor has a gate connected to the second scan line, a source connected to the reference signal line and a drain connected to a gate of the photosensitive transistor and the second terminal of the first storage capacitor, and is configured to write the signal on the reference signal line into the second terminal of the first storage capacitor under the control of the second scan line; the photosensitive transistor has a gate connected to a source thereof and a drain connected to the first terminal of the first storage capacitor, and is configured to sense the photosensitive signal and write the same into the first terminal of the first storage capacitor.

Optionally, the display sub-circuit comprises a second storage capacitor, a driving transistor, a charging and discharging unit, and a light emitting control unit. The driving transistor has a source connected to a first terminal of the second storage capacitor, and a drain connected to a light emitting device.

The charging and discharging unit is connected to the data line, the first scan line, the second scan line, the power supply line, the second storage capacitor and the driving transistor; and is configured to charge the two terminals of the second storage capacitor and a gate of the driving transistor such that a voltage across the two terminals of the second storage capacitor is a voltage on the power supply line and a voltage at the gate of the driving transistor is a voltage on the data line under the control of the first and second scan lines, and to discharge the second storage capacitor such that a voltage difference between the gate and the source of the driving transistor is a threshold voltage of the driving transistor under the control of the first and second scan lines.

The light emitting control unit is connected to the first scan line, the second terminal of the second storage capacitor and the driving transistor, and is configured to make the driving transistor drive the light emitting device to emit light under the control of the first scan line.

Optionally, the charging and discharging unit comprises: a first transistor, a second transistor, a fourth transistor and a fifth transistor; wherein the first transistor has a gate connected to the second scan line, a source connected to the power supply line, and a drain connected to the first terminal of the second storage capacitor, and is configured to write the voltage on the power supply line into the first terminal of the second storage capacitor, and to disconnect the first terminal of the second storage capacitor and the power supply line, so as to discharge the voltage across the two terminals of the second storage capacitor to the voltage difference between the gate and the source of the driving transistor, that is, the threshold voltage of the driving transistor; the second transistor has a gate connected to the first scan line, a source connected to the second terminal of the second storage capacitor, and a drain connected to ground, and is configured to connect the second terminal of the second storage capacitor to ground under the control of the first scan line; the fourth transistor has a gate connected to the first scan line, a source connected to the data line, and a drain connected to the gate of the driving transistor, and is configured to set the voltage at the gate of the driving transistor to the voltage on the data line under the control of the first scan line; the fifth transistor has a gate connected to the first scan line, a source connected to the light emitting device, and a drain connected to ground, and is configured to shorten the light emitting device to connect the light emitting device to ground under the control of the first scan line.

Optionally, the light emitting control unit comprises a third transistor, wherein the third transistor has a gate connected to the first scan line, a source connected to the second terminal of the second storage capacitor, and a drain connected to the gate of the driving transistor, and is configured to form a path between the second terminal of the second storage capacitor and the gate of the driving transistor under the control of the first scan line.

Optionally, the light emitting device is an organic light emitting diode having an anode connected to the drain of the driving transistor and the source of the fifth transistor and a cathode connected to ground.

In an embodiment of the present disclosure, there is provided a driving method for the pixel driving circuit described above, comprising: driving the light emitting device to emit light for display by the display sub-circuit under the control of the first scan line, the second scan line, the data line and the power supply line; and sensing a touch action by the photosensitive sub-circuit under the control of the second scan line.

Optionally, the photo sensitive sub-circuit comprises: a reference signal line, a signal detecting line, a first storage capacitor, a signal sensing unit and a signal reading-writing unit; wherein sensing a touch action by the photosensitive sub-circuit under the control of the second scan line particularly comprises: applying a second scan valid signal to the second scan line, such that the signal reading-writing unit writes a signal on the signal detecting line into the first terminal of the first storage capacitor to initialize the first terminal of the first storage capacitor; applying a third scan valid signal to the second scan line, such that the signal sensing unit writes a signal on the reference signal line and a sensed photosensitive signal into the first storage capacitor; applying the second scan valid signal to the second scan line, such that the signal reading-writing unit reads out a signal stored in the first storage capacitor and transmits the same to the signal detecting line.

Optionally, the signal reading-writing unit comprises a sixth transistor having a gate connected to the second scan line, a source connected to the first terminal of the first storage capacitor, and a drain connected to the signal detecting line. The applying a second scan valid signal to the second scan line such that the signal reading-writing unit writes a signal on the signal detecting line into the first terminal of the first storage capacitor to initialize the first terminal of the first storage capacitor particularly comprises: applying the second scan valid signal to the second scan line, such that the sixth transistor is turned on to write the signal on the signal detecting line into the first terminal of the first storage capacitor to initialize the first terminal of the first storage capacitor. The applying the second scan valid signal to the second scan line such that the signal reading-writing unit reads out a signal stored in the first storage capacitor and transmits the same to the signal detecting line particularly comprises: applying the second scan valid signal to the second scan line, such that the sixth transistor is turned on to read out a signal stored in the first storage capacitor and transmit the same to the signal detecting line.

Optionally, the signal sensing unit comprises a seventh transistor and a photosensitive transistor, wherein the seventh transistor has a gate connected to the second scan line, a source connected to the reference signal line and a drain connected to a gate of the photosensitive transistor and the second terminal of the first storage capacitor; the photosensitive transistor has the gate connected to a source thereof and a drain connected to the first terminal of the first storage capacitor. The applying a third scan valid signal to the second scan line such that the signal sensing unit writes a signal on the reference signal line and a sensed photosensitive signal into the first storage capacitor comprises: applying a third scan valid signal to the second scan line, such that the seventh transistor and the photosensitive transistor are turned on, the seventh transistor writes the signal on the reference signal line into the second terminal of the first storage capacitor, and the photosensitive transistor writes the sensed photosensitive signal into the first terminal of the first storage capacitor.

Optionally, the display sub-circuit comprises a second storage capacitor, a driving transistor, a charging and discharging unit, and a light emitting control unit. The driving transistor has a source connected to a first terminal of the second storage capacitor, and a drain connected to a light emitting device. The driving the light emitting device to emit light for display by the display sub-circuit under the control of the first scan line, the second scan line, the data line and the power supply line particularly comprises: applying a first scan valid signal to the first scan line and meanwhile applying the second scan valid signal to the second scan line, such that the charging and discharging unit charges the two terminals of the second storage capacitor and a gate of the driving transistor, so as to make a voltage across the two terminals of the second storage capacitor be a voltage on the power supply line and a voltage at the gate of the driving transistor be a voltage on the data line; maintaining the first scan line to supply the first scan valid signal and meanwhile applying the third scan valid signal to the second scan line, such that the charging and discharging unit discharges the second storage capacitor, so as to make a voltage difference between the gate and the source of the driving transistor be a threshold voltage of the driving transistor; and applying an invalid signal to the first scan line and meanwhile applying the second scan valid signal to the second scan line, such that the light emitting control unit forms a path between the second terminal of the second storage capacitor and the gate of the driving transistor, and that the source of the driving transistor is connected to the power supply line to drive the light emitting device to emit light.

Optionally, the charging and discharging unit comprises: a first transistor, a second transistor, a fourth transistor and a fifth transistor; wherein the first transistor has a gate connected to the second scan line, a source connected to the power supply line, and a drain connected to the first terminal of the second storage capacitor; the second transistor has a gate connected to the first scan line, a source connected to the second terminal of the second storage capacitor, and a drain connected to ground; the fourth transistor has a gate connected to the first scan line, a source connected to the data line, and a drain connected to the gate of the driving transistor; the fifth transistor has a gate connected to the first scan line, a source connected to the light emitting device, and a drain connected to ground. The applying a first scan valid signal to the first scan line and meanwhile applying the second scan valid signal to the second scan line such that the charging and discharging unit charges the two terminals of the second storage capacitor and a gate of the driving transistor so as to make a voltage across the two terminals of the second storage capacitor be a voltage on the power supply line and a voltage at the gate of the driving transistor be a voltage on the data line particularly comprises: applying a first scan valid signal to the first scan line and meanwhile applying the second scan valid signal to the second scan line such that the first transistor, the second transistor, the fourth transistor and the fifth transistor are turned on, the first transistor writes the voltage on the power supply line into the first terminal of the second storage capacitor, the second transistor connects the second terminal of the second storage capacitor to ground, the fourth transistor sets the voltage at the gate of the driving transistor to the voltage on the data line, the fifth transistor shortens the light emitting device to connect the light emitting device to ground. The maintaining the first scan line to supply the first scan valid signal and meanwhile applying the third scan valid signal to the second scan line such that the charging and discharging unit discharges the second storage capacitor so as to make a voltage difference between the gate and the source of the driving transistor be a threshold voltage of the driving transistor particularly comprises: maintaining the first scan line to supply the first scan valid signal and meanwhile applying the third scan valid signal to the second scan line, such that the first transistor is turned off, the second storage capacitor is discharged so as to make the voltage difference between the gate and the source of the driving transistor be the threshold voltage of the driving transistor.

Optionally, the light emitting control unit comprises a third transistor, wherein the third transistor has a gate connected to the first scan line, a source connected to the second terminal of the second storage capacitor, and a drain connected to the gate of the driving transistor. The applying an invalid signal to the first scan line and meanwhile applying the second scan valid signal to the second scan line such that light emitting control unit forms a path between the second terminal of the second storage capacitor and the gate of the driving transistor and that the source of the driving transistor is connected to the power supply line to drive the light emitting device to emit light particularly comprises: applying an invalid signal to the first scan line and meanwhile applying the second scan valid signal to the second scan line, the first transistor and the third transistor are turned on, the third transistor forms a path between the second terminal of the second storage capacitor and the gate of the driving transistor, and the first transistor connects the source of the driving transistor to the power supply line.

In the embodiments of the present disclosure, there is further provided an array substrate comprising the above-described pixel driving circuit.

In the embodiments of the present disclosure, there is further provided a display device comprising the above array substrate.

The pixel driving circuit according to the embodiments of the present disclosure comprises a display sub-circuit and a photosensitive sub-circuit and display and touch sensing are achieved in the pixel driving circuit by the display sub-circuit and the photosensitive sub-circuit sharing signal lines (for example, a second scan line).

DETAILED DESCRIPTION

Figure 1:
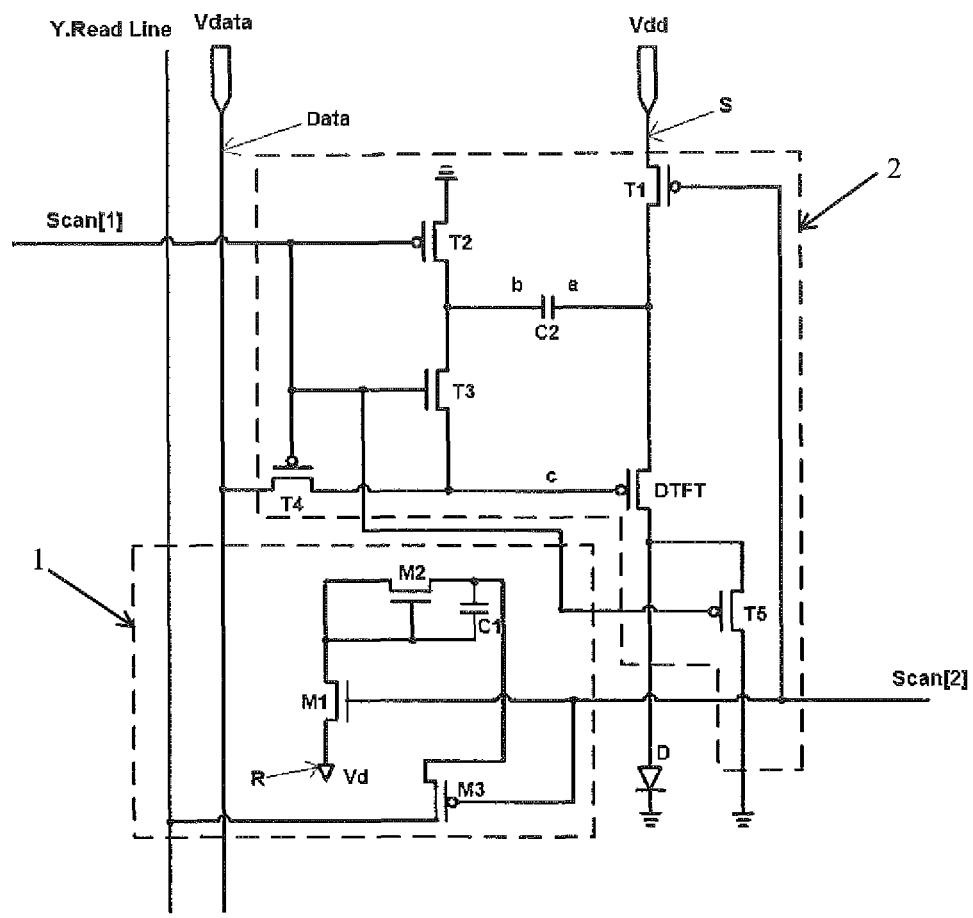
FIG. 1 is a schematic diagram illustrating a structure of a pixel driving circuit according to an embodiment of the present disclosure.

Below, particular implementations of the present disclosure will be described in detail with reference to the accompanying drawings and the embodiments of the present disclosure. The following embodiments are only for illustrating the present disclosure, but not for limiting scope of the present disclosure.

A pixel driving circuit according to the embodiments of the present disclosure comprises: a data line Data, a first scan line Scan[1], a second scan line Scan[2], a power supply line S, a light emitting device D, a display sub-circuit 2 and a photosensitive sub-circuit 1.

The display sub-circuit 2 is connected to the data line Data, the first scan line Scan[1], the second scan line Scan[2], the power supply line S and the light emitting device D, and is configured to drive the light emitting device D to emit light for display under the control of the first scan line Scan[1], the second scan line Scan[2], the data line Data and the power supply line S.

The photosensitive sub-circuit 1 is connected to the second scan line Scan[2], and is configured to sense a touch action under the control of the second scan line Scan[2] and the data line Data.

In the present embodiment, the photosensitive sub-circuit 1 comprises: a reference signal line R, a signal detecting line Y. Read Line, a first storage capacitor C1, a signal sensing unit and a signal reading-writing unit.

The signal reading-writing unit is connected to a first terminal of the first storage capacitor C1, the second scan line Scan[2] and the signal detecting line Y. Read Line, and is configured to, under the control of the second scan line Scan[2], write a signal on the signal detecting line Y. Read Line into the first terminal of the first storage capacitor C1 (during an initializing period, the first terminal of the first storage capacitor C1 is initialized by using a signal on Y. Read Line), or read out a signal stored in the first storage capacitor C1 and transmit the same to the signal detecting line Y. Read Line (during a signal reading period, the signal stored in the first storage capacitor C1 is read out and transmitted to the signal detecting line Y. Read Line).

The signal sensing unit is connected to the second scan line Scan[2], the reference signal line R and the first storage capacitor C1, and is configured to write a signal on the reference signal line R and a sensed photosensitive signal into the first storage capacitor C1 under the control of the second scan line Scan[2].

Here, the second scan line Scan[2] has a function of a horizontal detecting line, a data processing unit of a display apparatus (which is based on a known principle, details omitted herein) is connected to Y. Read Line and Scan[2] of each of the pixel units, and determines that there is a touch action when detecting that change in the signal outputted from Y. Read Line is greater than a threshold, and a touch position is thus determined by Y. Read Line and a corresponding Scan[2].

In the present embodiment, the signal reading-writing unit comprises a sixth transistor M3 having a gate connected to the second scan line Scan[2], a source connected to the first terminal of the first storage capacitor C1, and a drain connected to the signal detecting line Y. Read Line. The sixth transistor M3 is configured to write the signal on the signal detecting line Y. Read Line into the first terminal of the first storage capacitor C1 which functions as an initialization signal of the first terminal of the first storage capacitor C1 during an initializing period. In addition, the sixth transistor M3 is further configured to read out the signal stored in the first storage capacitor C1 and transmit the same to the signal detecting line Y. Read Line, such that the signal stored in the first storage capacitor C1 is read out and transmitted to the signal detecting line Y. Read Line during a signal reading period. Generally, an amplifier can be set at the end of the signal detecting line, the signal detecting line Y. Read Line can deliver the signal to the amplifier at the end thereof. Read Line, the signal amplified by the amplifier is supplied to the data processing unit in the display apparatus so as to be calculated and analyzed. The difference, between the intensity of the optoelectronic signal generated in a case in which there is no touch and that of the optoelectronic signal generated in a case in which there is a touch, is compared with a no-touch threshold, so as to determine whether there is a touch (the determination is similar to that in the prior art, details omitted herein).

The signal sensing unit comprises a seventh transistor M1 and a photosensitive transistor M2. The seventh transistor M1 has a gate connected to the second scan line Scan[2], a source connected to the reference signal line R and a drain connected to a gate of the photosensitive transistor M2 and the second terminal of the first storage capacitor C1. The seventh transistor M1 is configured to write the signal on the reference signal line into the second terminal of the first storage capacitor C1. The photosensitive transistor M2 has a gate connected to a source thereof and a drain connected to the first terminal of the first storage capacitor C1, and is configured to sense the photosensitive signal and write the same into the first terminal of the first storage capacitor C1.

The pixel driving circuit according to the embodiments of the present disclosure comprises a display sub-circuit and a photosensitive sub-circuit and achieves the functions of display and touch sensing while the display sub-circuit and the photosensitive sub-circuit sharing signal lines (for example, a second scan line), "touch" as mentioned in the present disclosure comprises touch by finger or touch by laser.

In the present embodiment, the display sub-circuit 2 comprises a second storage capacitor C2, a driving transistor DTFT, a charging and discharging unit, and a light emitting control unit. The driving transistor DTFT has a source connected to a first terminal (point a) of the second storage capacitor, and a drain connected to the light emitting device D.

The charging and discharging unit is connected to the data line Data, the first scan line Scan[1], the second scan line Scan[2], the power supply line S, the second storage capacitor C2 and the driving transistor DTFT; and is configured to charge, under the control of the first and second scan lines Scan[1] and Scan[2], the two terminals of the second storage capacitor C2 and a gate of the driving transistor DTFT such that a voltage across the two terminals of the second storage capacitor C2 is a voltage on the power supply line and a voltage at the gate of the driving transistor DTFT is a voltage on the data line, and to discharge the second storage capacitor C2 such that a voltage difference between the gate and the source of the driving transistor DTFT is a threshold voltage $V_{th}$ of the driving transistor DTFT under the control of the first and second scan lines Scan[1] and Scan[2].

The light emitting control unit is connected to the first scan line Scan[1], the second terminal of the second storage capacitor C2 and the driving transistor DTFT, and is configured to connect the driving transistor DTFT to the power supply line S to drive the light emitting device D to emit light under the control of the first scan line Scan[1].

In the present embodiment, the charging and discharging unit comprises: a first transistor T1, a second transistor T2, a fourth transistor T4 and a fifth transistor T5. The first transistor T1 has a gate connected to the second scan line Scan[2], a source connected to the power supply line S, and a drain connected to the first terminal of the second storage capacitor C2. The first transistor T1 is configured to write the voltage $V_{dd}$ on the power supply line into the first terminal of the second storage capacitor C2, and to disconnect the first terminal of the second storage capacitor C2 and the power supply line S, so as to discharge the voltage across the two terminals of the second storage capacitor C2 to the voltage difference between the gate and the source of the driving transistor DTFT, that is, the threshold voltage $V_{th}$ of the driving transistor DTFT. The second transistor T2 has a gate connected to the first scan line Scan[1], a source connected to the second terminal (point b) of the second storage capacitor C2, and a drain connected to ground. The second transistor T2 is configured to connect the second terminal of the second storage capacitor C2 to ground (that is, a voltage at the second terminal of the second storage capacitor C2 is 0, and the voltage across the two terminals of the second storage capacitor C2 is $V_{dd}$). The fourth transistor T4 has a gate connected to the first scan line Scan[1], a source connected to the data line Data, and a drain connected to the gate of the driving transistor DTFT (point c). The fourth transistor T4 is configured to set the voltage at the gate of the driving transistor DTFT to the voltage on the data line (that is, the voltage at the gate of the driving transistor DTFT is $V_{data}$). The fifth transistor T5 has a gate connected to the first scan line Scan[1], a source connected to the light emitting device D, and a drain connected to ground, and is configured to shorten the light emitting device D to connect the light emitting device D to ground.

In the present embodiment, the light emitting control unit comprises a third transistor T3. The third transistor T3 has a gate connected to the first scan line Scan[1], a source connected to the second terminal of the second storage capacitor C2, and a drain connected to the gate of the driving transistor DTFT. The third transistor T3 is configured to form a path between the second terminal of the second storage capacitor C2 and the gate of the driving transistor DTFT, that is, connect the second terminal of the second storage capacitor C2 to the gate of the driving transistor DTFT.

In the present embodiment, the light emitting device D is an organic light emitting diode OLED having an anode connected to the drain of the driving transistor DTFT and the source of the fifth transistor T5 and a cathode connected to ground.

The pixel driving circuit according to the present embodiment removes the effect due to the change in the threshold voltage $V_{th}$ of the driving transistor in a manner of compensating the change in the threshold voltage $V_{th}$ of the driving transistor. Meanwhile, such configuration further ensures that no current flows through the light emitting device OLED during a compensating and buffering period of the circuit, and thus improves lifespan of OLED indirectly.

In the embodiments of the present disclosure, the AMOLED display technology is efficiently integrated with the photosensitive in cell touch, and the display sub-circuit is not limited to the display sub-circuit as described in the embodiments of the present disclosure as long as a display sub-circuit which is under the control of the first scan line, the second scan line and the data line and may have different number of TFTs, different number of capacitors, and different connection relationship.

Furthermore, a driving method for the above-described pixel driving circuit is provided in the embodiments of the present disclosure. In the driving method, the display sub-circuit 2 drives the light emitting device D to emit light for display under the control of the first scan line Scan[1], the second scan line Scan[2], the data line Data and the power supply line S; and the photosensitive sub-circuit 1 senses a touch action under the control of the second scan line Scan[2].

Optionally, the photo sensitive sub-circuit 1 comprises: a reference signal line R, a signal detecting line Y. Read Line, a first storage capacitor C1, a signal sensing unit and a signal reading-writing unit. The step that the photosensitive sub-circuit 1 senses a touch action under the control of the second scan line Scan[2] particularly comprises: applying a second scan valid signal to the second scan line Scan[2], such that the signal reading-writing unit writes a signal on the signal detecting line Y. Read Line into the first terminal of the first storage capacitor C1 to initialize the first terminal of the first storage capacitor C1; applying a third scan valid signal to the second scan line Scan[2], such that the signal sensing unit writes a signal on the reference signal line R and a sensed photosensitive signal into the first storage capacitor C1; applying the second scan valid signal to the second scan line Scan[2], such that the signal reading-writing unit reads out a signal stored in the first storage capacitor C1 and transmits the same to the signal detecting line Y. Read Line.

Optionally, the signal reading-writing unit comprises a sixth transistor M3 having a gate connected to the second scan line Scan[2], a source connected to the first terminal of the first storage capacitor C1, and a drain connected to the signal detecting line Y. Read Line.

The step of applying a second scan valid signal to the second scan line Scan[2] such that the signal reading-writing unit writes a signal on the signal detecting line Y. Read Line into the first terminal of the first storage capacitor C1 to initialize the first terminal of the first storage capacitor C1 particularly comprises: applying the second scan valid signal to the second scan line Scan[2], such that the sixth transistor M3 is turned on to write the signal on the signal detecting line Y. Read Line into the first terminal of the first storage capacitor C1 to initialize the first terminal of the first storage capacitor C1.

The step of applying the second scan valid signal to the second scan line Scan[2] such that the signal reading-writing unit reads out a signal stored in the first storage capacitor C1 and transmits the same to the signal detecting line particularly comprises: applying the second scan valid signal to the second scan line Scan[2], such that the sixth transistor M3 is turned on to read out a signal stored in the first storage capacitor C1 and transmit the same to the signal detecting line Y. Read Line.

Optionally, the signal sensing unit comprises a seventh transistor M1 and a photosensitive transistor M2. The seventh transistor M1 has a gate connected to the second scan line Scan[2], a source connected to the reference signal line R and a drain connected to a gate of the photosensitive transistor M2 and the second terminal of the first storage capacitor C1; the photosensitive transistor M2 has the gate connected to a source thereof and a drain connected to the first terminal of the first storage capacitor C1.

The step of applying a third scan valid signal to the second scan line Scan[2] such that the signal sensing unit writes a signal on the reference signal line R and a sensed photosensitive signal into the first storage capacitor C1 comprises: applying a third scan valid signal to the second scan line Scan[2], such that the seventh transistor M1 and the photosensitive transistor M2 are turned on, the seventh transistor M1 writes the signal on the reference signal line R into the second terminal of the first storage capacitor C1, and the photosensitive transistor M2 writes the sensed photosensitive signal into the first terminal of the first storage capacitor C1.

Optionally, the display sub-circuit 2 comprises a second storage capacitor C2, a driving transistor DTFT, a charging and discharging unit, and a light emitting control unit. The driving transistor DTFT has a source connected to a first terminal of the second storage capacitor C2, and a drain connected to a light emitting device D. The step that the display sub-circuit 2 drives the light emitting device D to emit light for display under the control of the first scan line Scan[1], the second scan line Scan[2], the data line Data and the power supply line S particularly comprises: applying a first scan valid signal to the first scan line Scan[1] and meanwhile applying the second scan valid signal to the second scan line Scan[2], such that the charging and discharging unit charges the two terminals of the second storage capacitor C2 and a gate of the driving transistor DTFT, so as to make a voltage across the two terminals of the second storage capacitor C2 be a voltage on the power supply line S and a voltage at the gate of the driving transistor DTFT be a voltage on the data line Data; maintaining the first scan line Scan[1] to supply the first scan valid signal and meanwhile applying the third scan valid signal to the second scan line Scan[2], such that the charging and discharging unit discharges the second storage capacitor C2, so as to make a voltage difference between the gate and the source of the driving transistor DTFT be a threshold voltage of the driving transistor DTFT; and applying an invalid signal to the first scan line Scan[1] and meanwhile applying the second scan valid signal to the second scan line Scan[2], such that light emitting control unit forms a path between the second terminal of the second storage capacitor C2 and the gate of the driving transistor DTFT, and that the source of the driving transistor DTFT is connected to the power supply line S to drive the light emitting device D to emit light.

Optionally, the charging and discharging unit comprises: a first transistor T1, a second transistor T2, a fourth transistor T4 and a fifth transistor T5. The first transistor T1 has a gate connected to the second scan line Scan[2], a source connected to the power supply line S, and a drain connected to the first terminal of the second storage capacitor C2. The second transistor T2 has a gate connected to the first scan line Scan[1], a source connected to the second terminal of the second storage capacitor C2, and a drain connected to ground. The fourth transistor T4 has a gate connected to the first scan line Scan[1], a source connected to the data line Data, and a drain connected to the gate of the driving transistor DTFT. The fifth transistor T5 has a gate connected to the first scan line Scan[1], a source connected to the light emitting device D, and a drain connected to ground.

The step of applying a first scan valid signal to the first scan line Scan[1] and meanwhile applying the second scan valid signal to the second scan line Scan[2] such that the charging and discharging unit charges the two terminals of the second storage capacitor C2 and a gate of the driving transistor DTFT so as to make a voltage across the two terminals of the second storage capacitor C2 be a voltage on the power supply line and a voltage at the gate of the driving transistor DTFT be a voltage on the data line Data particularly comprises: applying a first scan valid signal to the first scan line Scan[1] and meanwhile applying the second scan valid signal to the second scan line Scan[2] such that the first transistor T1, the second transistor T2, the fourth transistor T4 and the fifth transistor T5 are turned on, the first transistor T1 writes the voltage on the power supply line into the first terminal of the second storage capacitor C2, the second transistor T2 connects the second terminal of the second storage capacitor C2 to ground, the fourth transistor T4 sets the voltage at the gate of the driving transistor DTFT to the voltage on the data line Data, the fifth transistor T5 shortens the light emitting device D to connect the light emitting device D to ground.

The step of maintaining the first scan line Scan[1] to supply the first scan valid signal and meanwhile applying the third scan valid signal to the second scan line Scan[2] such that the charging and discharging unit discharges the second storage capacitor C2 so as to make a voltage difference between the gate and the source of the driving transistor DTFT be a threshold voltage of the driving transistor DTFT particularly comprises: maintaining the first scan line Scan[1] to supply the first scan valid signal and meanwhile applying the third scan valid signal to the second scan line Scan[2], such that the first transistor T1 is turned off, the second storage capacitor C2 starts to be discharged so as to make the voltage difference between the gate and the source of the driving transistor DTFT be the threshold voltage of the driving transistor DTFT.

Optionally, the light emitting control unit comprises a third transistor T3 which has a gate connected to the first scan line Scan[1], a source connected to the second terminal of the second storage capacitor C2, and a drain connected to the gate of the driving transistor DTFT.

The step of applying an invalid signal to the first scan line Scan[1] and meanwhile applying the second scan valid signal to the second scan line Scan[2] such that light emitting control unit forms a path between the second terminal of the second storage capacitor C2 and the gate of the driving transistor DTFT and that the source of the driving transistor DTFT is connected to the power supply line S to drive the light emitting device D to emit light particularly comprises: applying an invalid signal to the first scan line Scan[1] and meanwhile applying the second scan valid signal to the second scan line Scan[2], the first transistor T1 and the third transistor T3 are turned on, the third transistor T3 forms a path between the second terminal of the second storage capacitor C2 and the gate of the driving transistor DTFT, and the first transistor T1 connects the source of the driving transistor DTFT to the power supply line S.

Figure 2:
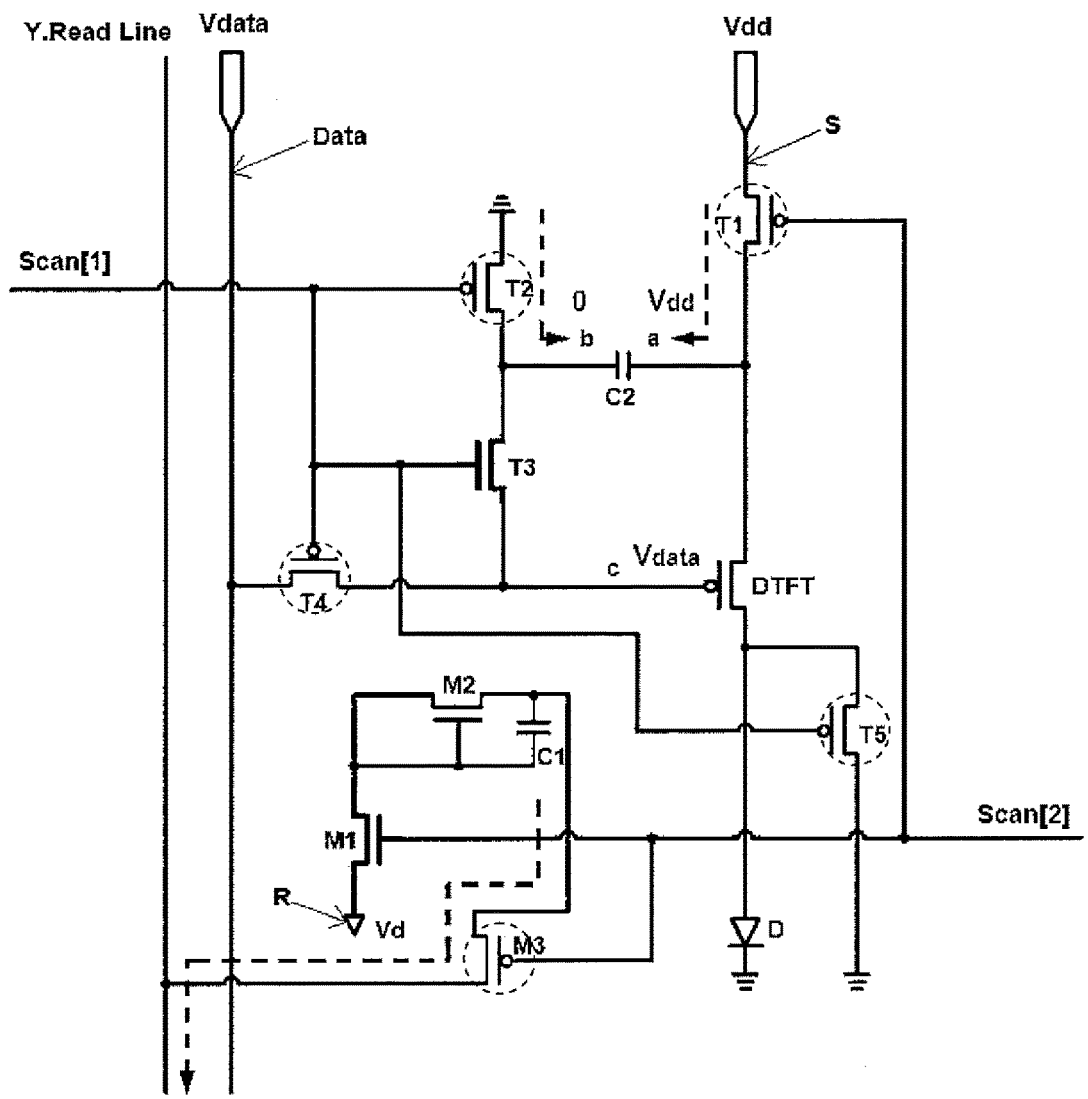
FIG. 2 is a schematic diagram illustrating an operation of the pixel driving circuit in FIG. 1 during a reset period.
Figure 3:
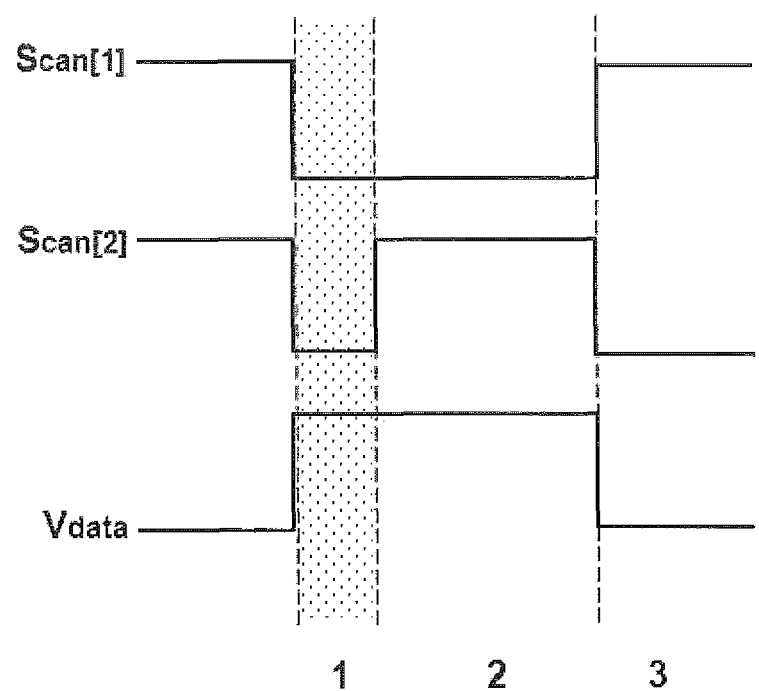
FIG. 3 is a schematic diagram illustrating a timing sequence of the pixel driving circuit in FIG. 1 during the reset period, which corresponding to a first period.
Figure 4:
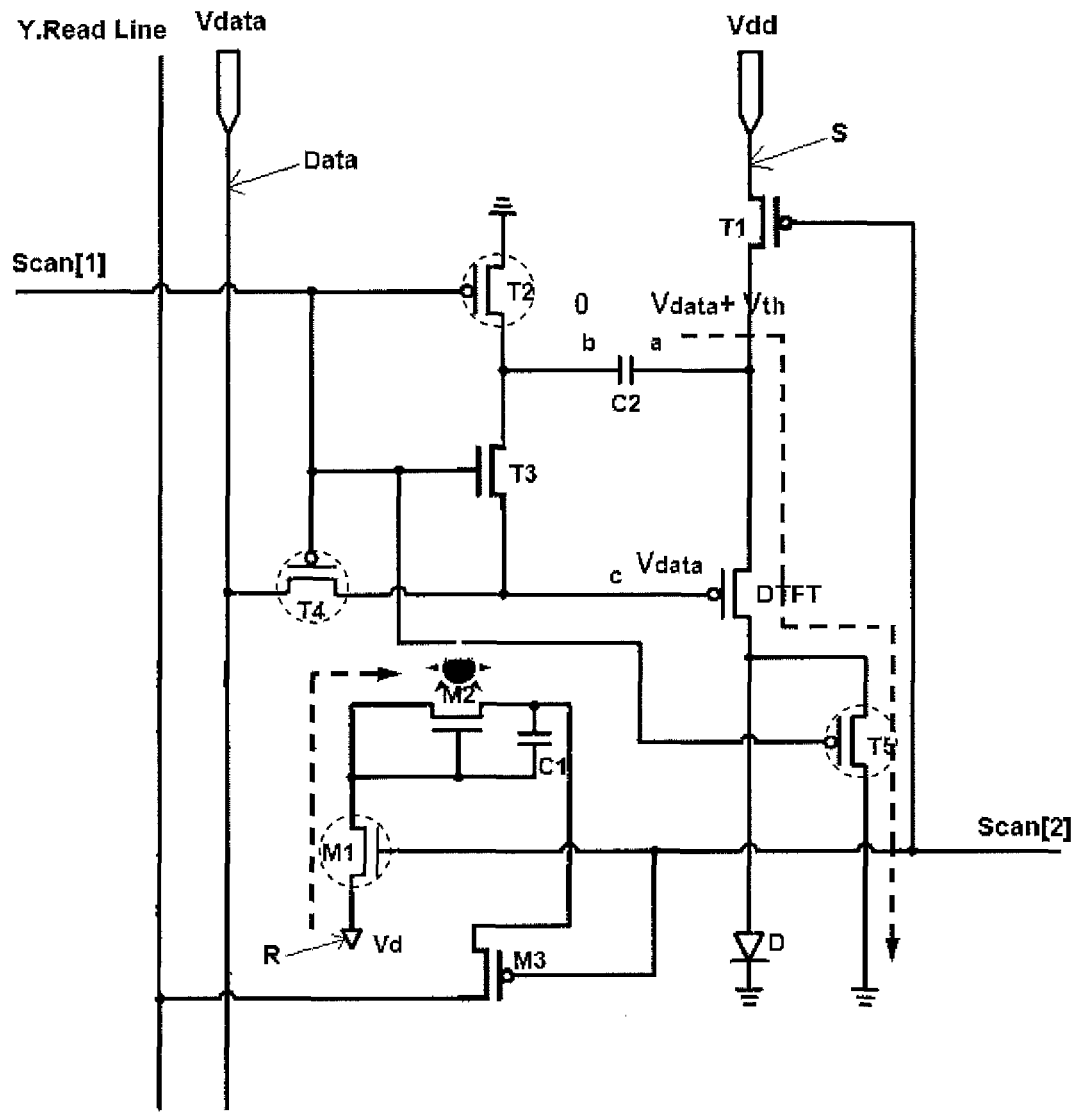
FIG. 4 is a schematic diagram illustrating an operation of the pixel driving circuit in FIG. 1 during a charging period.
Figure 5:
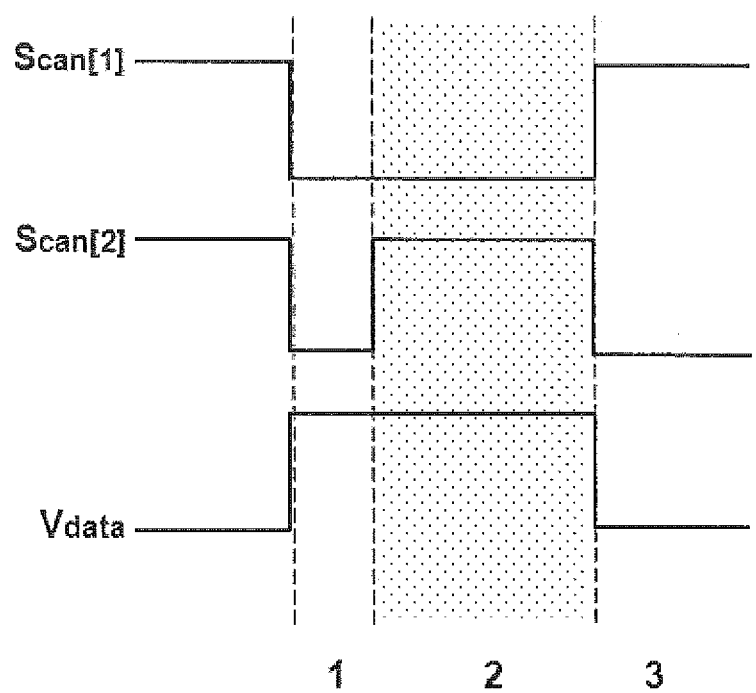
FIG. 5 is a schematic diagram illustrating a timing sequence of the pixel driving circuit in FIG. 1 during the charging period, which corresponding to a second period.
Figure 6:
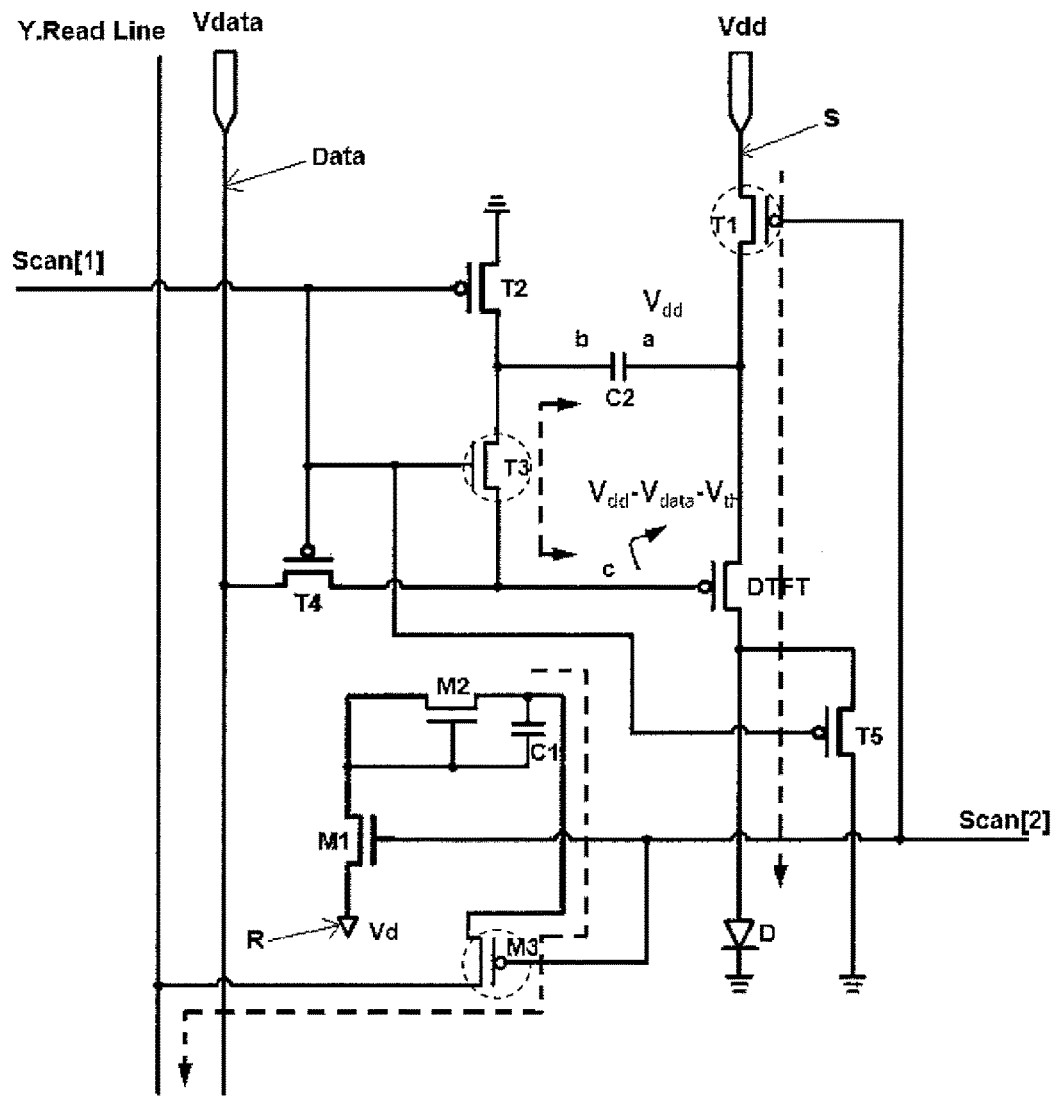
FIG. 6 is a schematic diagram illustrating an operation of the pixel driving circuit in FIG. 1 during a compensating period and a light-emitting period.

Below, particular explanation will be given to the driving process of the above-described pixel driving circuit (that is, the driving circuit as illustrated in FIG. 1, in which except that the third transistor T3, the seventh transistor M1 and the photosensitive transistor M2 are N type transistors, others are P type transistors, and the light emitting device is OLED), particularly as illustrated in FIGS. 2-7, there are three periods. Here, in order to facilitating the understanding, the operational principle of the photosensitive sub-circuit and the display sub-circuit are described separately although their operation is performed simultaneously during the actual operation. In FIG. 2, FIG. 4 and FIG. 6, a TFT in a dashed outline is an ON TFT and a dashed arrow represents a direction in which a current flows in each period.

As illustrated in FIG. 2 and FIG. 3, during a first period in the timing sequence diagram, the first scan line Scan[1] and the second scan line Scan[2] are at a low level (that is, the first scan valid signal and the second scan valid signal).

For the photosensitive sub-circuit, it is a signal initializing period, where Scan[2] is pulled down, M3 is turned on, such that the first terminal of the first storage capacitor C1 is connected to the signal detecting line Y. Read Line for collecting an initialization signal, so as to initialize the first terminal of the first storage capacitor and prepare for operation in a next period.

For the display sub-circuit, it is a signal resetting period, Scan[1] and Scan[2] are pulled down, T1, T2, T4, T5 are turned on and T3 is turned off, such that the first terminal (point a) of the second storage capacitor C2 is charged to $V_{dd}$, the second terminal (point b) is connected to ground and has a voltage of 0, the gate of DTFT (point c) has a voltage of $V_{data}$. T5 is turned on to shorten OLED and connect OLED to ground, such that no current flows through OLED during this period.

As illustrated in FIG. 4 and FIG. 5, during a second period in the timing sequence diagram, the first scan line Scan[1] is at a low level, and the second scan line Scan[2] is at a high level (that is, the third scan valid signal, which is valid for an N type transistor).

For the photosensitive sub-circuit, it is a signal collecting period, M2 is a photosensitive TFT, the gate and the source of M2 are connected, Scan[2] is pulled up, M1 is turned on, and thus a reference voltage $V_d$ is outputted. At this time, a potential conversion is performed by M2 itself, and the voltage difference stored in C1 is constant. When there is a touch (light touch or finger touch) at this location, light illumination intensity received by M2 varies and thus a charging current varies, wherein the light illumination intensity increases and the charging current increases if the touch is the light touch, for example, a laser touch, otherwise the light illumination intensity decreases and the charging current decreases if the touch is the finger touch which is equivalent to shading light. The voltage difference is stored in C1 for preparation of a signal reading period.

For the display sub-circuit, it is a discharging period, Scan[1] is at a low level, Scan[2] is pulled up. At this time, T2, T4 and T5 are turned on and T1 and T3 are turned off, such that the point a is discharged until a relationship $V_a - V_c = V_{th}$ is satisfied, that is, the potential at the point a changes from $V_{dd}$ to $V_{data} + V_{th}$. Similarly, during this discharging period, no current flows through OLED since T5 is in an ON state, such that the loss of the OLED can be reduced indirectly.

Figure 7:
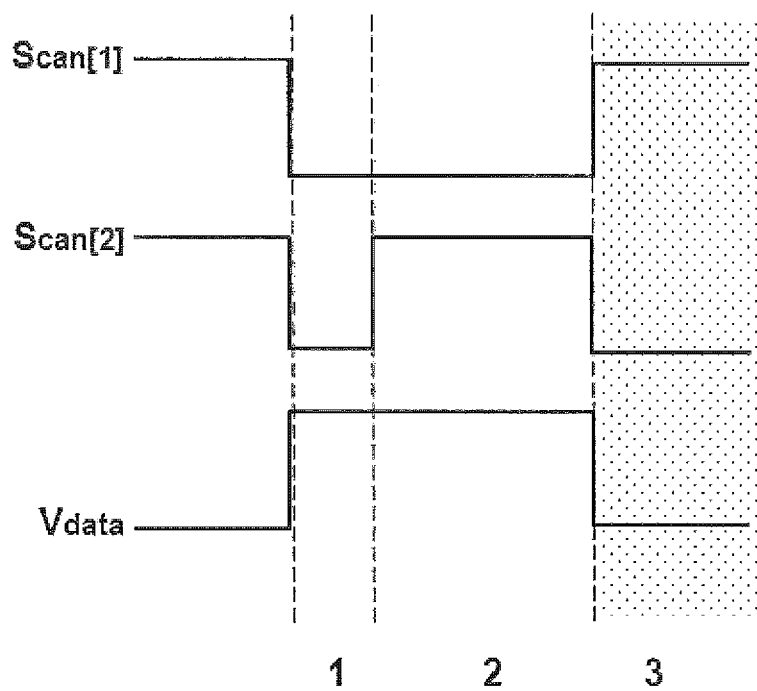
FIG. 7 is a schematic diagram illustrating a timing sequence of the pixel driving circuit in FIG. 1 during the compensating period and the light-emitting period, which corresponding to a third period.
Figure 8:
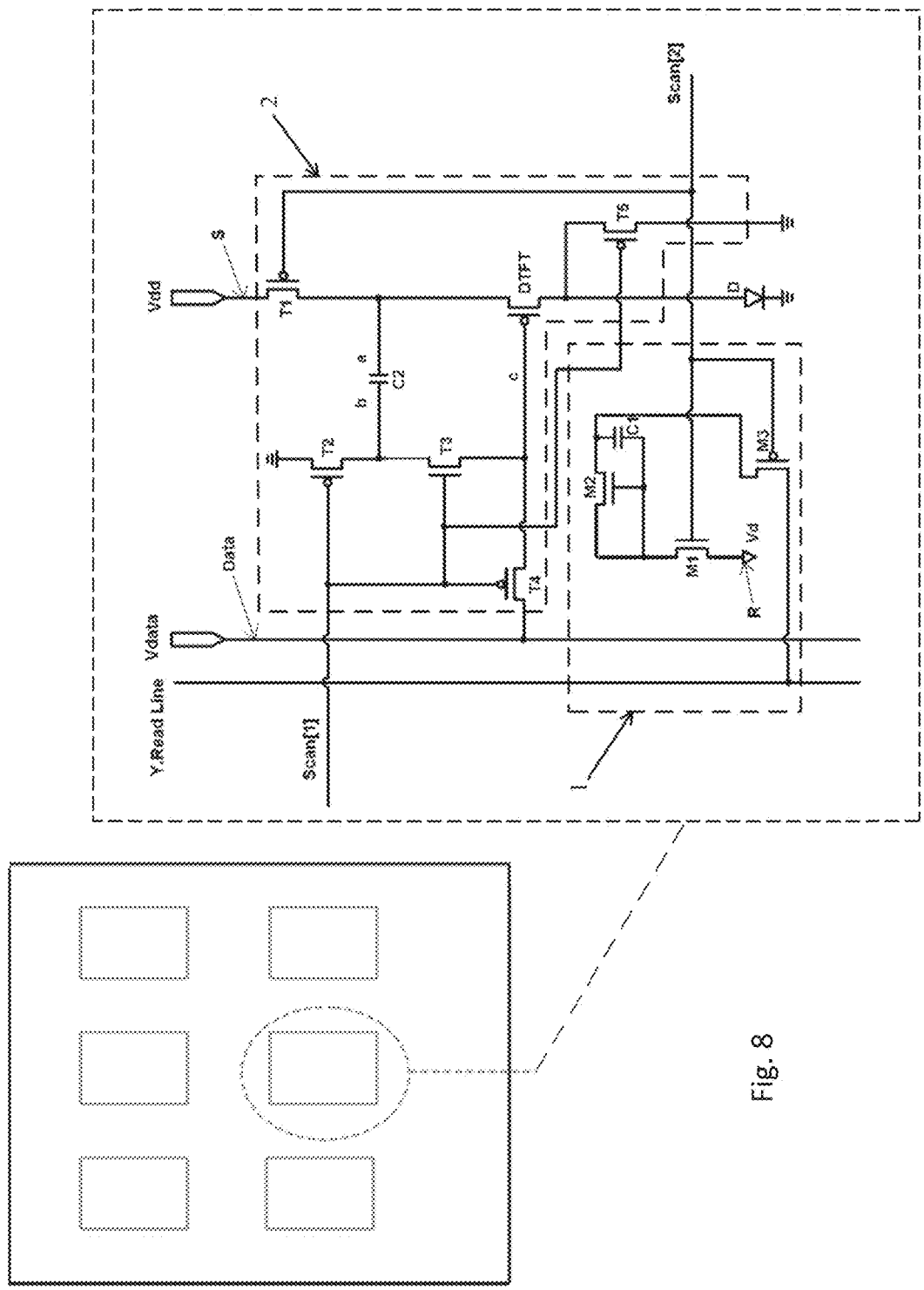
FIG. 8 is a diagram illustrating an array substrate comprising the pixel driving circuit of FIG. 1.

As illustrated in FIGS. 6 and 7, during a third period in the timing sequence diagram, the first scan line Scan[1] is at a high level, and the second scan line Scan[2] is at a low level.

For the photosensitive sub-circuit, it is a signal reading period, Scan[2] is pulled down. At this time, M1 is turned off and M3 is turned on, such that the charges previously stored in the first terminal of C1 are released, and such signal is delivered to the amplifier at the end of the signal detecting line Y. Read Line, and the amplified signal is provided to the data processing unit which performs data calculation and analysis.

In a case in which a touch action occurs during this period, a difference between an optoelectronic signal intensity before the touch action and an optoelectronic signal intensity after the touch action is compared to a no-touch threshold, such that it can be determined whether there is a touch (light illumination intensity varies). At this end, a coordinate in X direction is determined by an output point of Scan[2] at this time and a coordinate in Y direction is determined by Y. Read Line.

For the display sub-circuit, it is a normal light emitting period of an OLED pixel, the first scan line Scan[1] is pulled up, and the second scan line Scan[2] is pulled down. At this time, T1 and T3 are turned on and T2, T4 and T5 are turned off, the voltage at the point a reaches $V_{dd}$ again, the point b is in a floating state, an equal voltage transition is achieved in $V_a$ and $V_b$ (that is, the previous voltage difference $V_{data} + V_{th}$ between the points a and b is maintained). Therefore, $V_b = V_c = V_{dd} - V_{data} - V_{th}$, and T5 is turned off at this time to make OLED enter into a light emitting period.

From an equation for a saturation current of the driving transistor DTFT, it can be obtained that $$I_{OLED} = K(V_{GS} - V_{th})^2 = K[V_{dd} - (V_{dd} - V_{data} - V_{th}) - V_{th}]^2 = KV_{data}^2$$

$$K = \mu \cdot C_{ox} \frac{W}{L}$$

Where $\mu$ represents the carrier mobility, $C_{ox}$ represents the capacitance of the oxide layer of the gate, W/L represents the width/length ratio of the channel of the driving transistor DTFT.

From the above equation, it can be seen that the operating current $I_{OLED}$ is not affected by $V_{th}$ and only depends on $V_{data}$. Therefore, the problem of threshold voltage ($V_{th}$) drift due to the manufacturing process and long term operation of the driving transistors DTFTs is thoroughly removed, the effect of the threshold voltage ($V_{th}$) drift on $I_{OLED}$ is also removed, and thus the normal operation of OLED is ensured.

In the embodiments of the present disclosure, there is further provided an array substrate comprising the above-described pixel driving circuit.

In the embodiments of the present disclosure, there is further provided a display device comprising the above array substrate. The display device may be any products or components having display function such as AMOLED panel, television, digital photo frame, mobile phone, tablet and so on.

It should be understood that the above descriptions are only for illustrating the embodiments of the present disclosure, and in no way limit the scope of the present disclosure. Those skilled in the art may make variations or alternatives to the above embodiments without departing from the spirit and scope of the present disclosure, and thus all equivalent technical solutions should fall in the scope of the present disclosure which should be define by the attached claims.

The present application claims the priority of a Chinese patent application with an application No. 201410203607.X and filed on May 14, 2014, the disclosure of which is entirely incorporated herein as a part of the present disclosure by reference.

What is claimed is:

1. A pixel driving circuit comprising: a data line, a first scan line, a second scan line, a power supply line, a light emitting device, a display sub-circuit and a photosensitive sub-circuit; wherein the display sub-circuit is directly connected to the data line, the first scan line, the second scan line, the power supply line and the light emitting device, and is configured to drive the light emitting device to emit light for display under control of the first scan line, the second scan line, the data line and the power supply line; and the photosensitive sub-circuit is directly connected to the second scan line, and is configured to sense a touch action under control of the second scan line; wherein the photosensitive sub-circuit comprises: a reference signal line, a signal detecting line, a first storage capacitor, a signal sensing unit and a signal reading-writing unit; wherein the signal reading-writing unit is directly connected to a first terminal of the first storage capacitor, the second scan line and the signal detecting line, and is configured to write a signal on the signal detecting line into the first terminal of the first storage capacitor, or to read out a signal stored in the first storage capacitor and transmit the same to the signal detecting line under the control of the second scan line; and the signal sensing unit is directly connected to the second scan line, the reference signal line and the first storage capacitor, and is configured to write a signal on the reference signal line and a sensed photosensitive signal into the first storage capacitor under the control of the second scan line;

the signal reading-writing unit comprises a sixth transistor having a gate connected to the second scan line, a source connected to the first terminal of the first storage capacitor, and a drain connected to the signal detecting line, and being configured to write the signal on the signal detecting line into the first terminal of the first storage capacitor, or to read out the signal stored in the first storage capacitor and transmit the same to the signal detecting line under the control of the second scan line; and the signal sensing unit comprises a seventh transistor and a photosensitive transistor, wherein the seventh transistor has a gate directly connected to the second scan line, a source directly connected to the reference signal line and a drain directly connected to a gate of the photosensitive transistor and a second terminal of the first storage capacitor, and is configured to write the signal on the reference signal line into the second terminal of the first storage capacitor under the control of the second scan line; and the photosensitive transistor has a gate connected to a source thereof and a drain connected to the first terminal of the first storage capacitor, and is configured to sense the photosensitive signal and write the same into the first terminal of the first storage capacitor.

2. The pixel driving circuit of claim 1, wherein the display sub-circuit comprises a second storage capacitor, a driving transistor, a charging and discharging unit, and a light emitting control unit; wherein the driving transistor has a source connected to a first terminal of the second storage capacitor, and a drain connected to a light emitting device;

the charging and discharging unit is connected to the data line, the first scan line, the second scan line, the power supply line, the second storage capacitor and the driving transistor, and is configured to charge the two terminals of the second storage capacitor and a gate of the driving transistor such that a voltage across the two terminals of the second storage capacitor is a voltage on the power supply line and a voltage at the gate of the driving transistor is a voltage on the data line under the control of the first and second scan lines, and to further discharge the second storage capacitor such that a voltage difference between the gate and the source of the driving transistor is a threshold voltage of the driving transistor under the control of the first and second scan lines; and the light emitting control unit is connected to the first scan line, a second terminal of the second storage capacitor and the driving transistor, and is configured to make the driving transistor drive the light emitting device to emit light under the control of the first scan line.

3. The pixel driving circuit of claim 2, wherein the charging and discharging unit comprises: a first transistor, a second transistor, a fourth transistor and a fifth transistor; wherein the first transistor has a gate connected to the second scan line, a source connected to the power supply line, and a drain connected to the first terminal of the second storage capacitor, and is configured to, under the control of the second scan line, write the voltage on the power supply line into the first terminal of the second storage capacitor, and to further disconnect the first terminal of the second storage capacitor and the power supply line, so as to discharge the voltage across the two terminals of the second storage capacitor to the voltage difference between the gate and the source of the driving transistor which is the threshold voltage of the driving transistor;

the second transistor has a gate connected to the first scan line, a source connected to the second terminal of the second storage capacitor, and a drain connected to ground, and is configured to connect the second terminal of the second storage capacitor to ground under the control of the first scan line;

the fourth transistor has a gate connected to the first scan line, a source connected to the data line, and a drain connected to the gate of the driving transistor, and is configured to set the voltage at the gate of the driving transistor to the voltage on the data line under the control of the first scan line; and the fifth transistor has a gate connected to the first scan line, a source connected to the light emitting device, and a drain connected to ground, and is configured to shorten the light emitting device to connect the light emitting device to ground under the control of the first scan line.

4. The pixel driving circuit of claim 3, wherein the light emitting control unit comprises a third transistor, wherein the third transistor has a gate connected to the first scan line, a source connected to the second terminal of the second storage capacitor, and a drain connected to the gate of the driving transistor, and is configured to form a path between the second terminal of the second storage capacitor and the gate of the driving transistor.

5. The pixel driving circuit of claim 4, wherein the light emitting device is an organic light emitting diode having an anode connected to the drain of the driving transistor and to the source of the fifth transistor and a cathode connected to ground.

6. A method for driving a pixel driving circuit, wherein the pixel driving circuit comprises: a data line, a first scan line, a second scan line, a power supply line, a light emitting device, a display sub-circuit and a photosensitive sub-circuit;

the photosensitive sub-circuit comprises: a reference signal line, a signal detecting line, a first storage capacitor, a signal sensing unit and a signal reading-writing unit;

the method comprising: driving the light emitting device to emit light for display by the display sub-circuit under the control of the first scan line, the second scan line, the data line and the power supply line; and sensing a touch action by the photosensitive sub-circuit under the control of the second scan line;

wherein sensing the touch action by the photosensitive sub-circuit under the control of the second scan line comprises:

applying a second scan valid signal to the second scan line, such that the signal reading-writing unit writes the signal on the signal detecting line into a first terminal of a first storage capacitor to initialize the first terminal of the first storage capacitor;

applying a third scan valid signal to the second scan line, such that the signal sensing unit writes the signal on the reference signal line and the sensed photosensitive signal into the first storage capacitor; and applying the second scan valid signal to the second scan line, such that the signal reading-writing unit reads out the signal stored in the first storage capacitor and transmits the same to the signal detecting line.

7. The method of claim 6, wherein applying a second scan valid signal to the second scan line such that the signal reading-writing unit writes the signal on the signal detecting line into the first terminal of the first storage capacitor to initialize the first terminal of the first storage capacitor comprises: applying the second scan valid signal to the second scan line, such that a sixth transistor is turned on to write the signal on the signal detecting line into the first terminal of the first storage capacitor to initialize the first terminal of the first storage capacitor; and applying the second scan valid signal to the second scan line such that the signal reading-writing unit reads out the signal stored in the first storage capacitor and transmits the same to the signal detecting line comprises: applying the second scan valid signal to the second scan line, such that the sixth transistor is turned on to read out the signal stored in the first storage capacitor and transmit the same to the signal detecting line.

8. The method of claim 6, wherein applying a third scan valid signal to the second scan line such that the signal sensing unit writes the signal on the reference signal line and the sensed photosensitive signal into the first storage capacitor comprises: applying a third scan valid signal to the second scan line, such that a seventh transistor and a photosensitive transistor are turned on, wherein the seventh transistor writes the signal on the reference signal line into a second terminal of the first storage capacitor, and the photosensitive transistor writes the sensed photosensitive signal into the first terminal of the first storage capacitor.

9. The method of claim 6, wherein driving the light emitting device to emit light for display by the display sub-circuit under the control of the first scan line, the second scan line, the data line and the power supply line comprises:
applying a first scan valid signal to the first scan line and meanwhile applying the second scan valid signal to the second scan line, such that a charging and discharging unit charges the two terminals of a second storage capacitor and a gate of a driving transistor, so as to make a voltage across the two terminals of the second storage capacitor be the voltage on the power supply line and the voltage at the gate of the driving transistor be a voltage on the data line;
maintaining the first scan valid signal on the first scan line and meanwhile applying a third scan valid signal to the second scan line, such that the charging and discharging unit discharges the second storage capacitor, so as to make a voltage difference between the gate and the source of the driving transistor be a threshold voltage of the driving transistor; and
applying an invalid signal to the first scan line and meanwhile applying the second scan valid signal to the second scan line, such that a light emitting control unit forms a path between a second terminal of the second storage capacitor and the gate of the driving transistor, and that the source of the driving transistor is connected to the power supply line to drive the light emitting device to emit light.

10. The method of claim 9, wherein
applying the first scan valid signal to the first scan line and meanwhile applying the second scan valid signal to the second scan line such that the charging and discharging unit charges the two terminals of the second storage capacitor and the gate of the driving transistor so as to make the voltage across the two terminals of the second storage capacitor be the voltage on the power supply line and the voltage at the gate of the driving transistor be the voltage on the data line comprises: applying a first scan valid signal to the first scan line and meanwhile applying the second scan valid signal to the second scan line, such that a first transistor, a second transistor, a fourth transistor and a fifth transistor are turned on, the first transistor writes the voltage on the power supply line into the first terminal of the second storage capacitor, the second transistor connects the second terminal of the second storage capacitor to ground, the fourth transistor sets the voltage at the gate of the driving transistor to the voltage on the data line, the fifth transistor shortens the light emitting device to connect the light emitting device to ground; and
maintaining the first scan valid signal on the first scan line and meanwhile applying the third scan valid signal to the second scan line such that the charging and discharging unit discharges the second storage capacitor so as to make a voltage difference between the gate and the source of the driving transistor be the threshold voltage of the driving transistor comprises: maintaining the first scan valid signal on the first scan line and meanwhile applying the third scan valid signal to the second scan line, such that the first transistor is turned off, the second storage capacitor is discharged so as to make the voltage difference between the gate and the source of the driving transistor be the threshold voltage of the driving transistor.

11. The method of claim 10, wherein applying an invalid signal to the first scan line and meanwhile applying the second scan valid signal to the second scan line such that the light emitting control unit forms the path between the second terminal of the second storage capacitor and the gate of the driving transistor and that the source of the driving transistor is connected to the power supply line to drive the light emitting device to emit light comprises: applying an invalid signal to the first scan line and meanwhile applying the second scan valid signal to the second scan line, so that the first transistor and a third transistor are turned on, the third transistor forms the path between the second terminal of the second storage capacitor and the gate of the driving transistor, and the first transistor connects the source of the driving transistor to the power supply line.

12. An array substrate comprising the pixel driving circuit of claim 1.

13. The array substrate of claim 12, wherein the signal reading-writing unit comprises a sixth transistor having a gate connected to the second scan line, a source connected to the first terminal of the first storage capacitor, and a drain connected to the signal detecting line, and being configured to write the signal on the signal detecting line into the first terminal of the first storage capacitor, or to read out the signal stored in the first storage capacitor and transmit the same to the signal detecting line under the control of the second scan line.

14. The array substrate of claim 13, wherein the display sub-circuit comprises a second storage capacitor, a driving transistor, a charging and discharging unit, and a light emitting control unit; wherein the driving transistor has a source connected to a first terminal of the second storage capacitor, and a drain connected to a light emitting device;
the charging and discharging unit is connected to the data line, the first scan line, the second scan line, the power supply line, the second storage capacitor and the driving transistor, and is configured to charge the two terminals of the second storage capacitor and a gate of the driving transistor such that a voltage across the two terminals of the second storage capacitor is a voltage on the power supply line and a voltage at the gate of the driving transistor is a voltage on the data line under the control of the first and second scan lines, and to further discharge the second storage capacitor such that a voltage difference between the gate and the source of the driving transistor is a threshold voltage of the driving transistor under the control of the first and second scan lines; and
the light emitting control unit is connected to the first scan line, the second terminal of the second storage capacitor and the driving transistor, and is configured to make the driving transistor drive the light emitting device to emit light under the control of the first scan line.

\* \* \* \* \*

UNITED STATES PATENT AND TRADEMARK OFFICE
CERTIFICATE OF CORRECTION

PATENT NO. : 9,760,199 B2
APPLICATION NO. : 14/443445
DATED : September 12, 2017
INVENTOR(S) : Shengji Yang It is certified that error appears in the above-identified patent and that said Letters Patent is hereby corrected as shown below:

On the Title Page

Under Assignee, Item (73):
Please delete "BOE Technology Group., Ltd." and insert --BOE Technology Group Co., Ltd.--

Signed and Sealed this
Ninth Day of January, 2018

Joseph Matal
*Performing the Functions and Duties of the*
*Under Secretary of Commerce for Intellectual Property and*
*Director of the United States Patent and Trademark Office*